US009805616B1

(12) United States Patent
Brubaker et al.

(10) Patent No.: US 9,805,616 B1
(45) Date of Patent: Oct. 31, 2017

(54) TRAINING DEVICE FOR GAINING EMERGENCY ACCESS THROUGH A DOOR

(71) Applicant: Exact Corp., Modesto, CA (US)

(72) Inventors: Jason Brubaker, Modesto, CA (US); Heath Flora, Modesto, CA (US)

(73) Assignee: EXACT CORP., Modesto, CA (US)

( * ) Notice: Subject to any disclaimer, the term of this patent is extended or adjusted under 35 U.S.C. 154(b) by 121 days.

(21) Appl. No.: 14/451,300

(22) Filed: Aug. 4, 2014

Related U.S. Application Data

(60) Provisional application No. 61/862,058, filed on Aug. 4, 2013.

(51) Int. Cl.
*G09B 19/00* (2006.01)
*G09B 9/00* (2006.01)

(52) U.S. Cl.
CPC ...................... *G09B 9/00* (2013.01)

(58) Field of Classification Search
CPC ...... G09B 19/00; G09B 9/003; A62C 99/0081
USPC .................................. 434/219, 226
See application file for complete search history.

(56) References Cited

U.S. PATENT DOCUMENTS

| | | | | |
|---|---|---|---|---|
| 5,906,493 A * | 5/1999 | Bishop | ..................... | G09B 9/00 292/357 |
| 8,128,408 B2 * | 3/2012 | Phillips | ..................... | G09B 9/00 434/219 |
| 8,197,257 B2 * | 6/2012 | Clewis | ..................... | A62B 5/00 434/226 |
| 8,408,917 B2 * | 4/2013 | Perrone | ................ | G09B 19/003 434/226 |
| 8,439,685 B2 * | 5/2013 | Shelley | .............. | A62C 99/0081 434/226 |
| 8,485,825 B2 * | 7/2013 | Walker | ................... | G09B 19/00 434/226 |
| 8,720,117 B2 * | 5/2014 | Phillips | ..................... | F42B 8/00 434/226 |
| 9,646,515 B2 * | 5/2017 | Temple | .................. | G09B 25/00 |
| 2005/0050816 A1 * | 3/2005 | Manning | ................ | G09B 19/00 52/213 |
| 2009/0208914 A1 * | 8/2009 | Phillips | ..................... | G09B 9/00 434/219 |

(Continued)

OTHER PUBLICATIONS

"What's the Difference Between Compression Springs and Die Springs?", Oct. 6, 2014, European Springs. Retrieved Apr. 10, 2016 from <url: http://www.europeansprings.com/company/_news_detail.asp?nyhetsid=111&sprakid=1>.*

*Primary Examiner* — Kurt Fernstrom
(74) *Attorney, Agent, or Firm* — James M. Duncan, Esq.; Klein DeNatale Goldner

(57) ABSTRACT

A training device provides a simulator for gaining emergency access through a locked or barricaded door in emergency situations. The apparatus comprises a door support structure, which may be free-standing. The door support structure comprises a vertical rectangular support structure comprising a threshold member at the bottom, a head member at the top, a hinge side jamb member and a latch side jamb member. A vertical hinge attachment member is pivotally mounted to the hinge side jamb member. A door member translates with respect to the position of the vertical hinge attachment member along a plurality of pins extending between the vertical attachment member and the door member. The door member is normally biased towards the latch side jamb member.

7 Claims, 6 Drawing Sheets

(56) References Cited

U.S. PATENT DOCUMENTS

| | | | |
|---|---|---|---|
| 2009/0215014 A1* | 8/2009 | Walker | G09B 19/00 434/226 |
| 2011/0025076 A1* | 2/2011 | Shelley | A62C 99/0081 292/216 |
| 2015/0037767 A1* | 2/2015 | Britton | A62C 99/0081 434/226 |

* cited by examiner

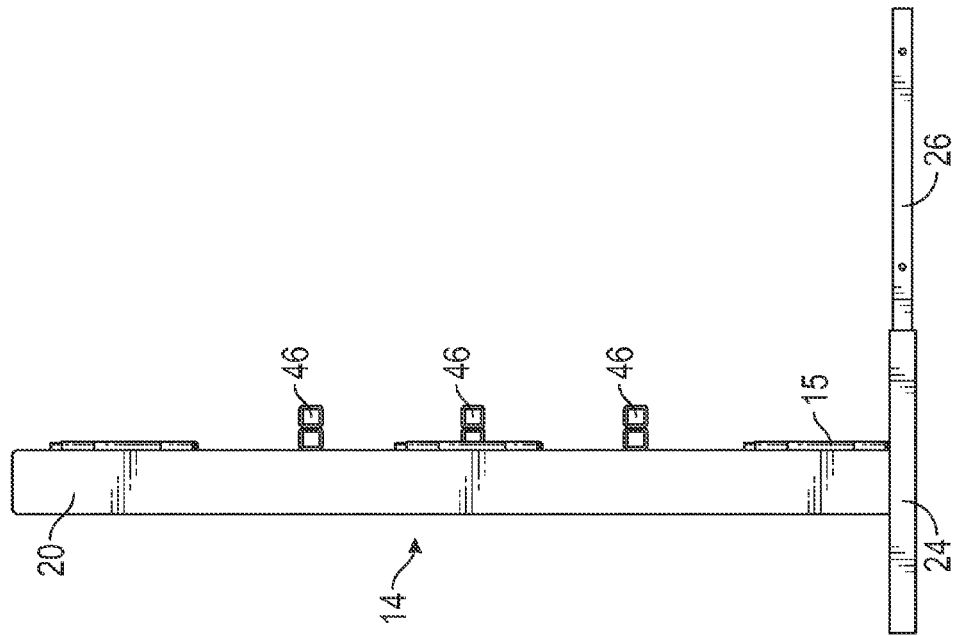
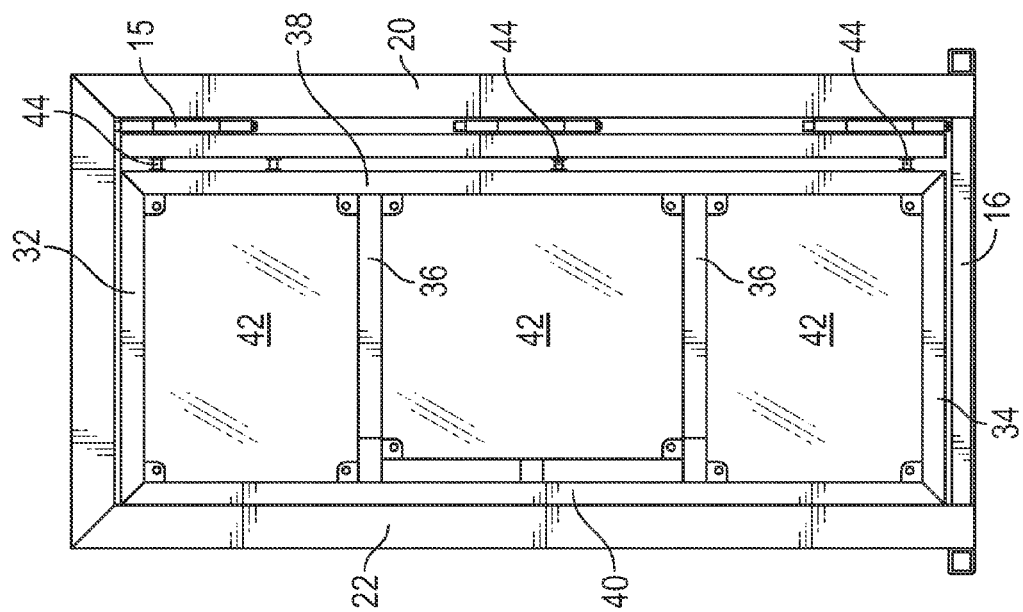

TRAINING DEVICE FOR GAINING EMERGENCY ACCESS THROUGH A DOOR

CROSS-REFERENCE TO RELATED APPLICATIONS

This is a non-provisional application which claims priority to provisional patent application No. 61/862,058 filed on Aug. 4, 2013.

BACKGROUND OF THE INVENTION

The invention relates to training devices which simulate making emergency entrances through locked or jammed doors. More particularly, the invention relates to a device which trains a person in the proper technique for gaining emergency access through a locked or jammed door.

There are occasions when various emergency personnel must gain access through a locked or jammed door in order to provide emergency services, such as fire fighting, providing emergency medical services, or in criminal apprehension or investigation. It is important that the emergency personnel receive training in methods of gaining access through locked or jammed doors so that in actual emergencies, such access may be gained as quickly and safely as possible. In the case of firefighters, it is know to pry open a locked door with a crowbar-like tool known as a "Haligan tool". However, given the dire consequences which may result if the only training an emergency response worker receives in opening locked doors is on-the-job training in actual emergency situations, it is best for emergency response workers to have repeated training exercises, where the consequences of failure or undue delay in opening the door are limited.

The difficulty presented by training with actual doors is that the technique involves wedging the Haligan tool into a gap between the door and the support structure. Once sufficient space begins to appear between the door and the jamb, the pry end of the hook can be inserted to maintain the purchase point or to force open the door. However, this technique frequently results in the destruction of the door and the support structure, making such training impractical and expensive.

As a result of the expense and impracticality of training with actual doors and adjoining structures, simulated doors and support structures have been developed which may be reused and allow the repeated practice for gaining emergency access through a locked or jammed door. For example, such simulators are disclosed in U.S. Pat. No. 5,906,493 (Bishop), U.S. Pat. No. 6,877,988 (Phillips et al) and within U.S. Patent Application Publications Nos. 2005/0050816 (Manning et al), 2008/0014564 (Allen), and 2010/0186324 (Staub). However, the known emergency door training simulators have one or more disadvantages, including being too complicated and expensive, failing to provide realistic training, or not providing reliable repetitive service. For example, many of the prior art devices do not utilize full size doors or allow the insertion of a Haligan tool at any vertical location in the gap between the door and the latch-side door jamb. In addition, the known training doors may not be easily transportable, be sufficiently stable to allow for aggressive training exercises, or the prior art devices utilize complicated mechanisms in order to provide for the repeated utilization of the device. Thus, a need exists for a training device for gaining emergency access through a locked or jammed door which is inexpensive, relatively simple to use, free-standing and stable, and which provides reliable repetitive training opportunities.

SUMMARY OF THE INVENTION

The disclosed training device for gaining emergency access through a door provides solutions to the problems identified above in the known devices. A training device provides a simulator for gaining emergency access through a locked or barricaded door in emergency situations. The apparatus comprises a door support structure, which may be free-standing. The door support structure comprises a vertical rectangular support structure comprising a threshold member at the bottom, a head member at the top, a hinge side jamb member and a latch side jamb member. A vertical hinge attachment member is pivotally mounted to the hinge side jamb member. A door member translates with respect to the position of the vertical hinge attachment member along a plurality of pins extending between the vertical attachment member and the door member. The door member is normally biased towards the latch side jamb member.

The door support structure comprises a vertical rectangular support structure comprising a threshold member at the bottom, a head member at the top, and jamb members on either side. To distinguish the two sides, the jamb member on the hinge side is referred to as the hinge side jamb member and the opposite jamb member is referred to as the latch side jamb member. If assembled in a free-standing configuration, the door support structure may further comprise horizontal base members which extend forwardly and rearwardly from the vertical rectangular support structure, providing a sufficiently stable platform for the device for the anticipated training exercises with the device in a free-standing position. The horizontal base members may either be removable or pivotable against the vertical support structure to allow removal or folding to facilitate transportation and storage. In using the training device in the free-standing configuration, the door will be opened toward the dominant base member. A dominant base member may be disposed on both sides of the vertical support structure, such that the door may be opened in either direction.

A vertical hinge attachment member is pivotally mounted to the hinge side jamb member. Attached to the vertical attachment member is a door member. The door member comprises a horizontal top rail, a horizontal bottom rail, one or more cross rails, a vertical hanging stile, a vertical latch stile, and panel members which fill in spaces between the rails and the stiles. The vertical hanging stile is attached to the vertical hinge attachment member with a plurality of guide pins, wherein the door member may laterally travel on the plurality of pins toward or away from the vertical attachment member, where the pins control lateral movement of the door member. The invention comprises biasing means, such as springs, which bias the door member away from the vertical attachment member. It is to be appreciated that in order to provide a realistic training exercise, it may be desirable to use springs which provide substantial resistance, such as ¾ inch diameter heavy duty die springs.

The above-described configuration provides an adjustable gap between the door member and the latch side jamb member which extends all of the way from the head to the threshold of the rectangular support structure. That is, in a training exercise, the door panel may be forced toward the vertical attachment member by insertion of a tool at any vertical location in the gap between the vertical latch stile and the latch side door jamb, thus most approximating the "real life" doors the trainee may encounter in an actual emergency response situation. Having a gap which extends along the entire latch-side edge of the door member allows the trainee to select any vertical position for insertion of a tool, which is exactly the situation the trainee would be facing in a real situation.

BRIEF DESCRIPTION OF THE DRAWINGS

FIG. 3 is a rear view of the embodiment depicted in FIG. 1.

FIG. 4 is a side view of the embodiment depicted in FIG. 1.

DETAILED DESCRIPTION OF THE EMBODIMENTS

Figure 1:
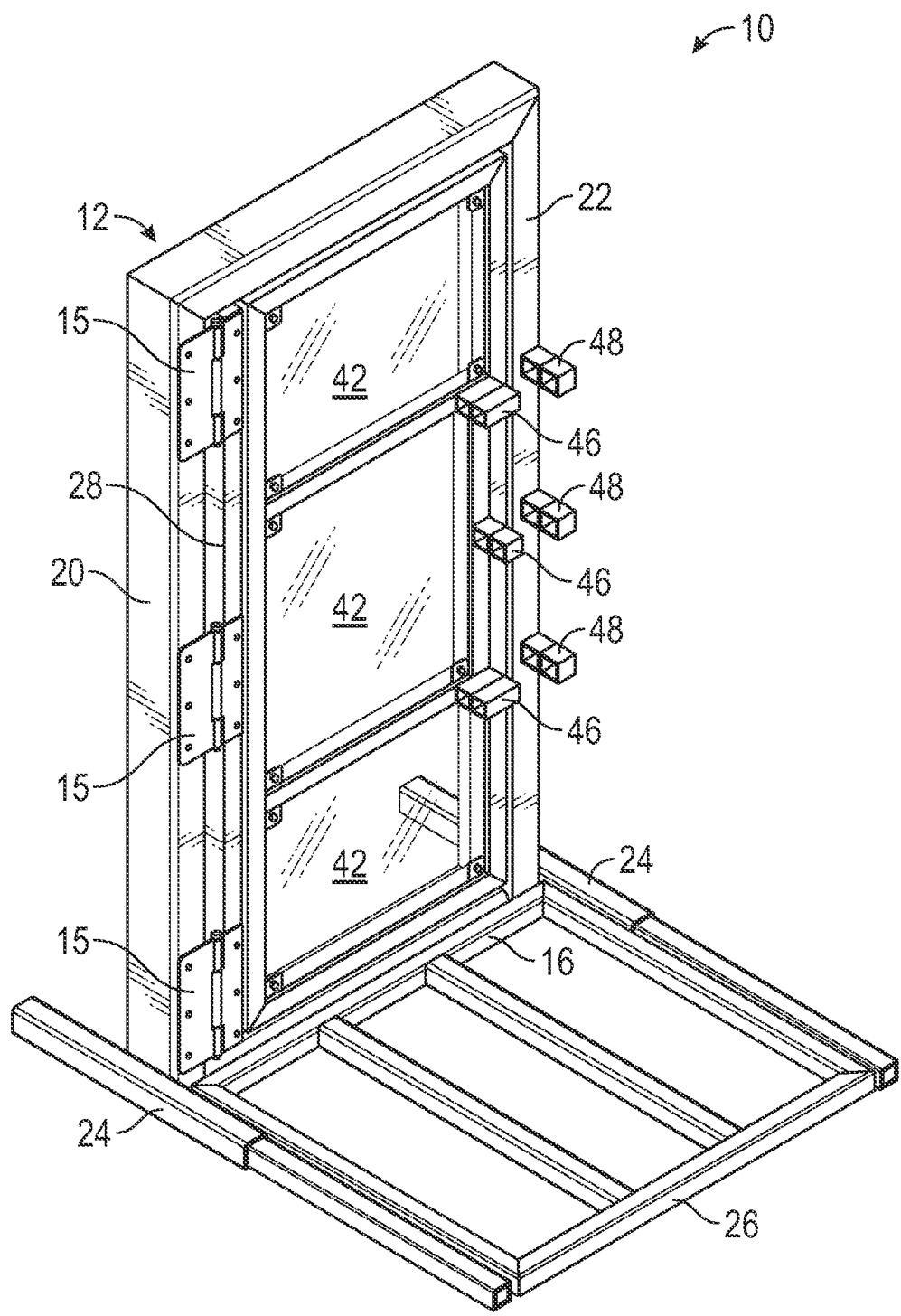
FIG. 1 is an isometric view of a free-standing embodiment of the training door.

Referring now to the drawings, FIG. 1 shows a free-standing embodiment of the training door 10. Training door 10 comprises a door support structure 12, which for training door 10 is free-standing. The door support structure 12 comprises a vertical rectangular support structure 14 comprising a threshold member 16 at the bottom, a head member 18 at the top, and jamb members on either side. To distinguish the two sides, the jamb member on the hinge side is referred to as the hinge side jamb member 20 and the opposite jamb member is referred to as the latch side jamb member 22. In the free-standing configuration, the door support structure may further comprise horizontal base members 24 which extend forwardly and rearwardly from the vertical rectangular support structure 14. The horizontal base members 24 provide a sufficiently stable platform for the device for the anticipated training exercises.

The horizontal base members 24 may further comprise a base extension member 26 which may either be removable or pivot against the vertical support structure 14 to facilitate transportation and storage. In using the training device in the free-standing configuration, the door will be opened toward the base extension member 26. A base extension member 26 may be disposed on both sides of the vertical support structure 14, such that the door may be opened in either direction.

A vertical hinge attachment member 28 is a relatively slender rail member pivotally mounted to the hinge side jamb member 20 with hinges 15. Slidingly attached to the vertical attachment member 28 is a door member 30. The door member 30 may comprise a horizontal top rail 32, a horizontal bottom rail 34, one or more cross rails 36, a vertical hanging stile 38, a vertical latch stile 40, and panel members 42 which fill in spaces between the various rails and stiles 38, 40. The vertical hanging stile 38 is slidingly attached to the vertical hinge attachment member 28 along a plurality of pins 44, wherein the door member 30 may laterally travel on the plurality of pins toward or away from the vertical attachment member 28 along a generally horizontal axis, such that the door member may be adjacent to the latch side jamb member 22, or translate along the plurality of pins toward the vertical attachment member 28 and away from the latch side jamb member.

Figure 2:
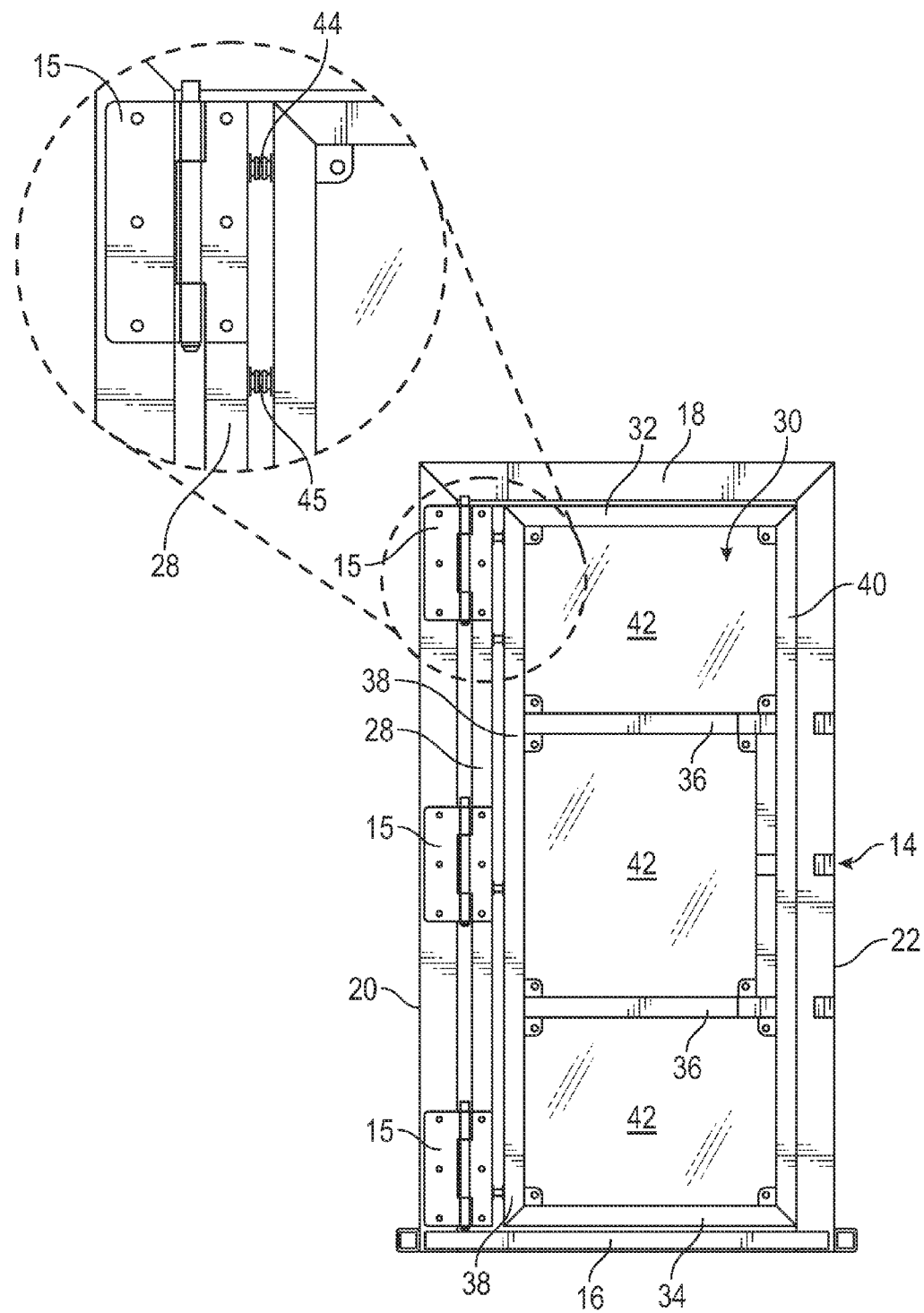
FIG. 2 is a front view of the embodiment depicted in FIG. 1, including a detailed view shown in Detail A.
Figure 5:
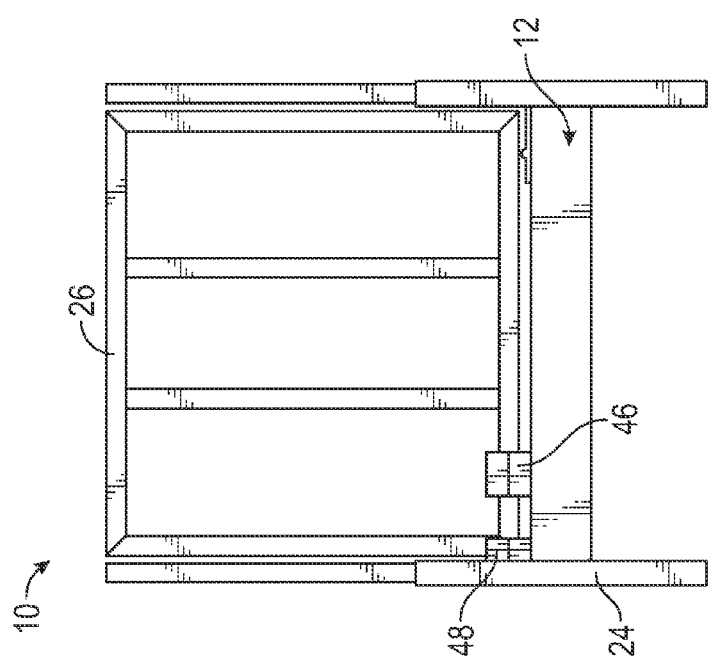
FIG. 5 is a top view of the embodiment depicted in FIG. 1.
Figure 6:
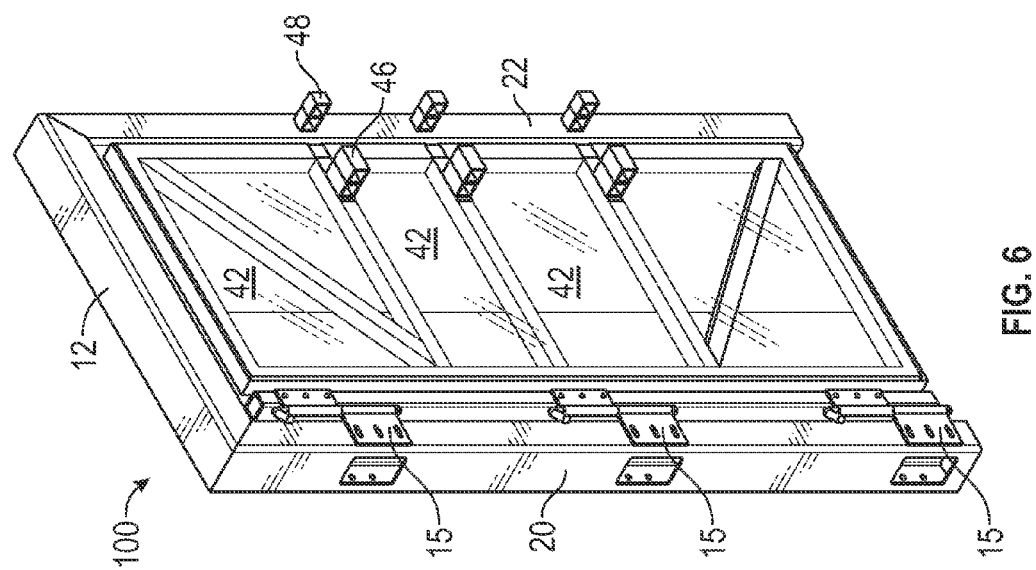
FIG. 6 is an isometric view of a fixed embodiment of the training door.
Figure 7:
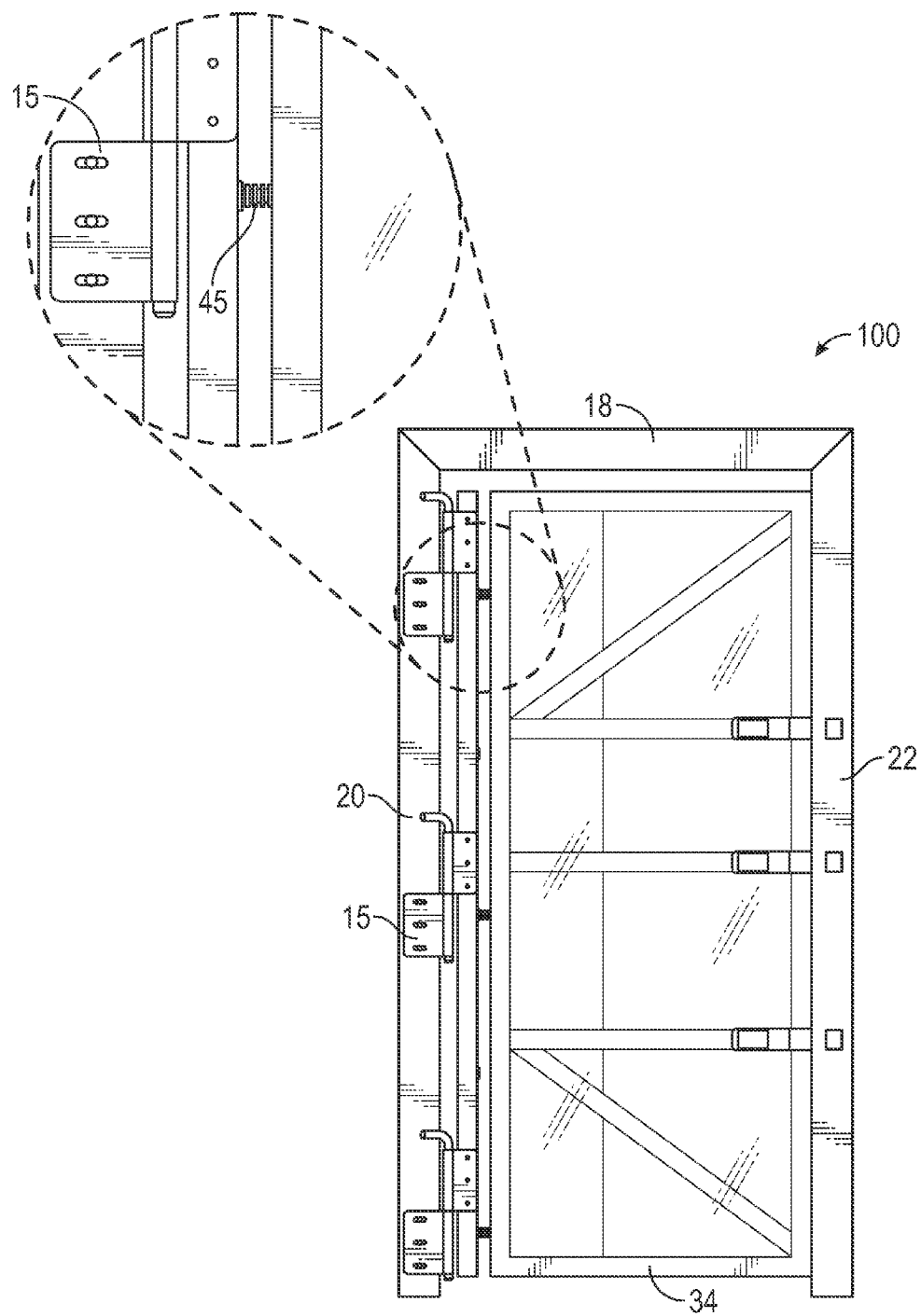
FIG. 7 is a front view of the embodiment depicted in FIG. 6, including a detailed view shown in Detail C.
Figure 8:
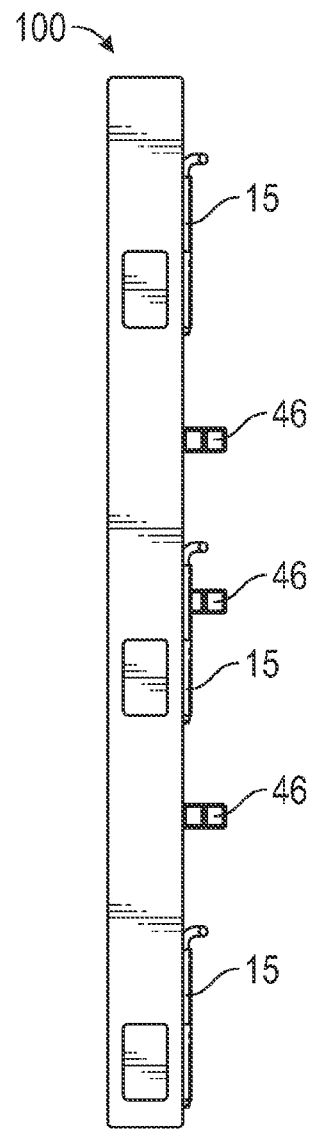
FIG. 8 is a side view of the embodiment depicted in FIG. 6.
Figure 9:
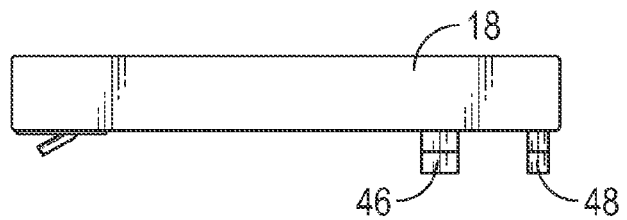
FIG. 9 is a top view of the embodiment depicted in FIG. 6.

The pins 44 may comprise ¾" steel pins which slide within bushings mounted to the tubing sections making up vertical attachment member 28 and vertical hanging stile 38. A biasing means, such as springs 45 (shown only once on FIG. 2, but a typical door may comprise four such springs), which bias the door member 30 away from the vertical attachment member 28 and toward the latch side jamb member 22. It is to be appreciated that in order to provide a realistic training exercise, it may be desirable to use springs which provide substantial resistance, such as ¾ inch diameter heavy duty die springs.

The apparatus 10 may further comprise locking means for maintaining the door in a closed position. While a latch and keeper may be utilized as with an actual door, these devices are likely to be damaged in a training exercise. Therefore, it is preferable to utilize locking means which are inexpensive and easily replaceable. Acceptable locking means may comprise one or more receptacles 46 on the door member 30, and opposite facing receptacles 48 on the latch side jamb member 22. In this configuration, destructible shear members such as wooden rods or dowels may be inserted within opposing receptacles 46, 48. The number and diameter of the wooden rods may be selected based upon the desired amount of force required in a particular training exercise.

FIGS. 6-9 depict a fixed embodiment of the training door 100. Except for the absence of horizontal base members and base extension members, the components of training door 100 are comparable to those shown in FIGS. 1-5 for the free-standing embodiment of the training door 10.

Dimensions shown on the various figures are provided for convenience, but the invention is not limited to any particular size or dimensions, and should not be limited by the disclosed dimensions. While the above is a description of various embodiments of the present invention, further modifications may be employed without departing from the spirit and scope of the present invention. Thus the scope of the invention should not be limited according to these factors, but according to the following appended claims.

What is claimed is:

1. A training apparatus which provides training for gaining emergency access through a doorway, the training apparatus comprising:
   a door support structure comprising a threshold member at the bottom, a head member at the top, a hinge side jamb member and a latch side jamb member;
   a vertical rail member pivotally attached to the hinge side jam member with at least one hinge, the vertical rail member having an outward side facing the hinge side jam member and an inward side facing opposite to the outward facing side;
   a plurality of pins extending horizontally from the inward side;
   a door member disposed between the vertical rail member and the latch side jamb member, the door member slidingly disposed on the plurality of pins such that the door member may laterally translate along the plurality of pins between the vertical rail member and the latch side jamb member;
   biasing means for urging the door member toward the latch side jamb member; and
   means for maintaining the door member in a closed position.

2. The training apparatus of claim 1 wherein the means for maintaining the door member in a closed position comprises a first receptacle on the door member, and opposite facing second receptacle on the latch side jamb member, and a destructible shear member extending between the first receptacle and the second receptacle.

3. The training apparatus of claim 1 wherein each pin of the plurality of pins slides within a first bushing mounted to the vertical rail member and a second bushing on the door member.

4. The training apparatus of claim 1 wherein the door support structure further comprises a forward side and a rearward side, the door support structure further comprising horizontal support members extending forward and rearward such that the door support structure is free standing.

5. The training apparatus of claim 1 wherein the door member comprises a horizontal top rail, a horizontal bottom rail, a cross rail, a vertical hanging stile, a vertical latch stile, and at least one panel member between the vertical hanging stile and the vertical latch stile.

6. The training apparatus of claim 5 wherein each pin of the plurality of pins slides within a first bushing mounted to the vertical rail member and a second bushing mounted on the vertical hanging style.

7. The training apparatus of claim 1 wherein the biasing means for urging the door member toward the latch side jamb member comprises a heavy duty die spring disposed about each pin of the plurality of pins.

* * * * *